United States Patent
Lasneski et al.

(10) Patent No.: US 6,559,837 B1
(45) Date of Patent: May 6, 2003

(54) IMAGE LUMINANCE DETECTION AND CORRECTION EMPLOYING HISTOGRAMS

(75) Inventors: Alan L. Lasneski, Turner, OR (US); Carl J. Ruggiero, Sherwood, OR (US)

(73) Assignee: InFocus Corporation, Wilsonville, OR (US)

( * ) Notice: Subject to any disclaimer, the term of this patent is extended or adjusted under 35 U.S.C. 154(b) by 106 days.

(21) Appl. No.: 09/669,091

(22) Filed: Sep. 25, 2000

(51) Int. Cl.$^7$ ................................................ G09G 5/00
(52) U.S. Cl. ........................................ 345/204; 348/537
(58) Field of Search .......................... 345/3.1, 3.2, 3.3, 345/204, 543, 544, 545, 547, 551, 552, 559, 571, 572; 382/168–172; 358/522, 523; 348/572, 573, 537, 536

(56) References Cited

U.S. PATENT DOCUMENTS

| | | | |
|---|---|---|---|
| 4,814,829 A | * | 3/1989 | Kosugi et al. |
| 5,490,222 A | * | 2/1996 | Sugimoto |
| 5,657,089 A | | 8/1997 | Onagawa ..................... 348/537 |
| 5,767,916 A | | 6/1998 | West ........................... 348/537 |
| 5,805,233 A | | 9/1998 | West ........................... 348/537 |
| 6,069,578 A | | 5/2000 | Liu et al. ..................... 341/122 |

FOREIGN PATENT DOCUMENTS

| | | | |
|---|---|---|---|
| EP | 0222508 | 5/1987 | ............ H04N/5/20 |
| EP | 1058234 | 12/2000 | ............ G09G/5/18 |
| JP | 1078525 | 3/1989 | ............ H03M/1/10 |
| JP | 1223888 | 9/1989 | ............ H04N/5/91 |

\* cited by examiner

*Primary Examiner*—Regina Liang
(74) *Attorney, Agent, or Firm*—Stoel Rives LLP

(57) ABSTRACT

A video projection display system (10) of this invention employs histograms to detect an active video region (2) of a video frame (1). A microcontroller (16) loads registers (27) in an ASIC (26) to accumulate histograms of low pixel values occurring within columns (70–74) of video data. The microcontroller scans the histograms to, identify the leftmost column in which a set (80) of black pixel values is clustered, which column marks the left edge of the active video region. The right edge of the active video region is detected in a similar manner. The video signal may also include overshoot and noise. When an ADC (24) digitizes the video signal, the overshoot and noise causes many bright pixels to be converted to below their maximum digital values. Therefore, the microcontroller programs the ASIC such that a histogram (90) of the highest pixel values is collected from within the active video region. The microcontroller then scans the histogram to locate a rapid decrease in the number of pixels having values greater than some large value. Pixels having even greater values fall within the overshoot and noise range. The microcontroller remaps the upper range of data to the maximum digital values, thereby enhancing image brightness at the high end of the pixel value range.

40 Claims, 5 Drawing Sheets

FIG. 5
| | 70 | 71 | 72 | 73 | 74 | | | | | | | | |
|---|---|---|---|---|---|---|---|---|---|---|---|---|---|
| 1 | 0 | 0 | 1 | 1 | 2 | 0 | | 0 | 4 | 3 | 2 | 4 | 0 |
| 2 | 1 | 1 | 2 | 2 | 5 | 1 | 3 | 0 | 0 | 1 | 1 | 2 | 1 |
| 3 | 2 | 5 | 10 | 11 | 255 | 247 | | 248 | 247 | 12 | 11 | 1 | 3 |
| 4 | 0 | 2 | 11 | 10 | 254 | 248 | | 247 | 248 | 12 | 11 | 2 | 0 |
| 5 | 1 | 3 | 11 | 9 | 250 | 248 | | 248 | 247 | 11 | 9 | 3 | 0 |
| 6 | 2 | 0 | 14 | 9 | 252 | 247 | | 247 | 248 | 9 | 9 | 4 | 0 |
| ROW | | | | | | | 2 | | | | | 3 | |
| 595 | 0 | 1 | 12 | 13 | 254 | 247 | | 247 | 247 | 9 | 10 | 0 | 1 |
| 596 | 2 | 0 | 10 | 11 | 255 | 248 | | 247 | 248 | 11 | 12 | 1 | 1 |
| 597 | 3 | 0 | 9 | 10 | 251 | 248 | | 249 | 248 | 10 | 10 | 0 | 2 |
| 598 | 0 | 1 | 9 | 10 | 253 | 247 | | 247 | 248 | 10 | 11 | 4 | 3 |
| 598 | 0 | 2 | 4 | 5 | 0 | 5 | 3 | 0 | 5 | 4 | 1 | 4 | 1 |
| 600 | 3 | 0 | 1 | 0 | 4 | 1 | | 5 | 1 | 0 | 0 | 0 | 1 |
1  2  3  4  5  6···COLUMN···795 796 797 798 799 800
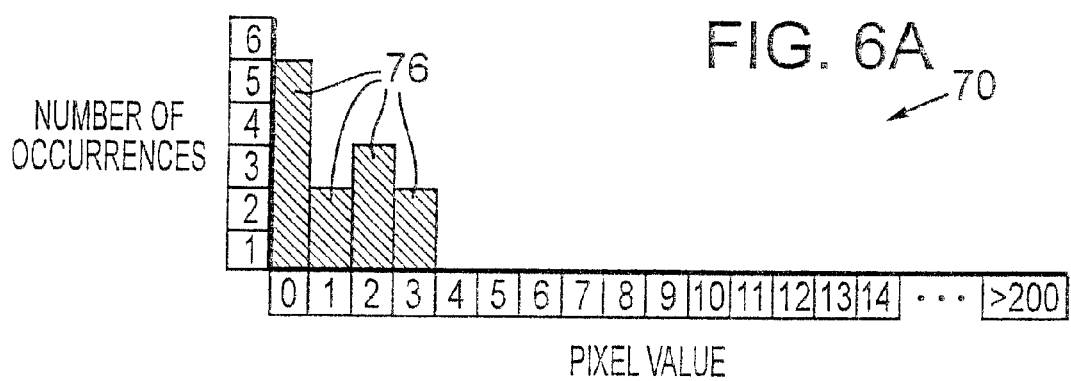
FIG. 6A
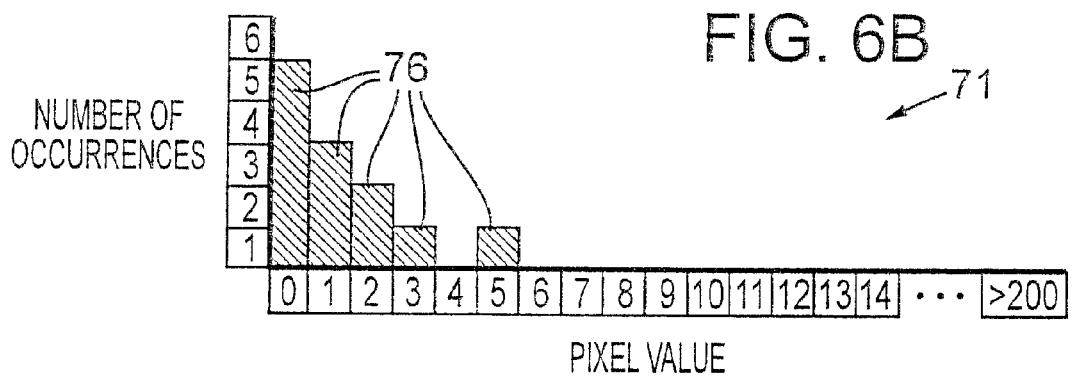
FIG. 6B

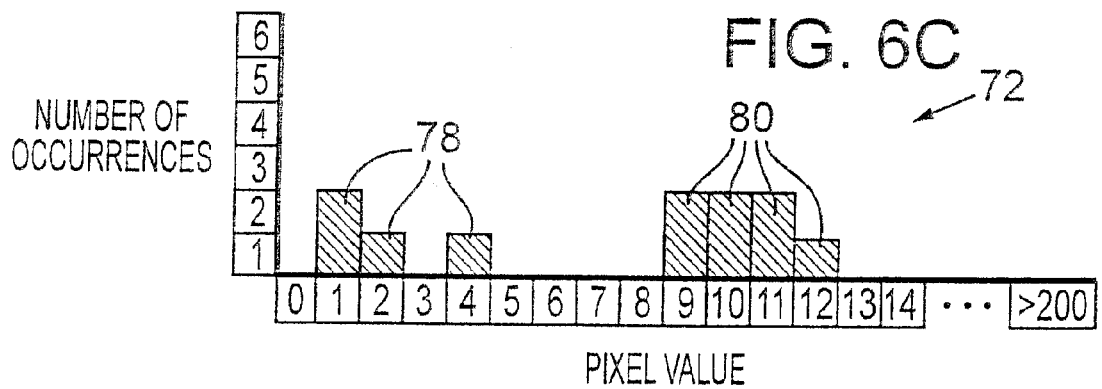
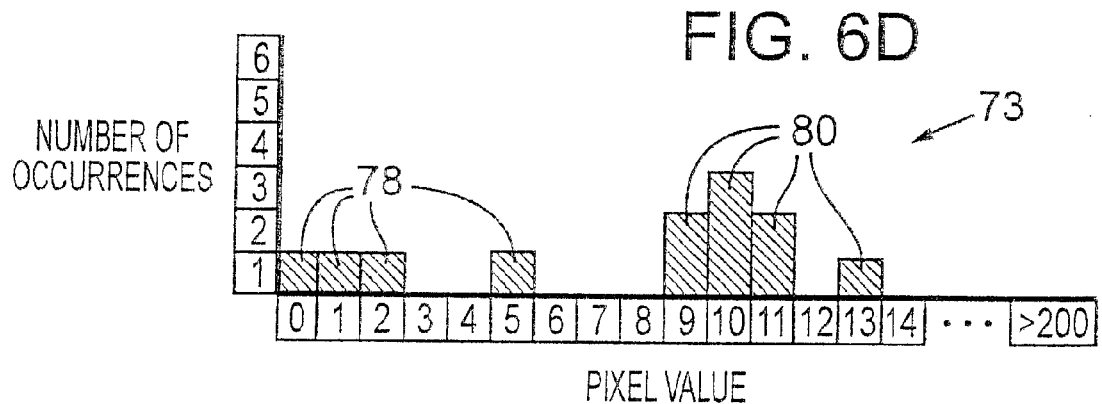
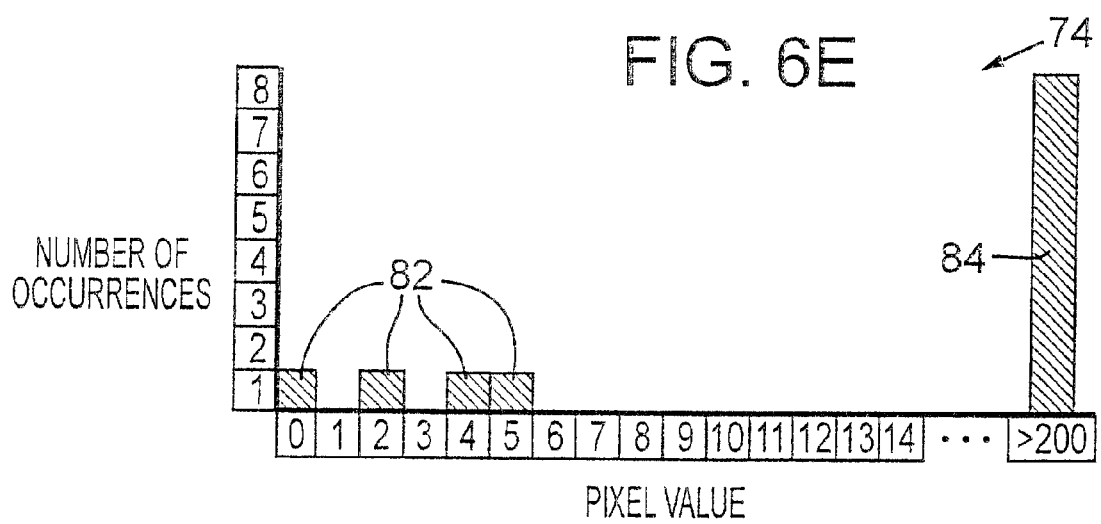

IMAGE LUMINANCE DETECTION AND CORRECTION EMPLOYING HISTOGRAMS

RELATED APPLICATION(S)

Not Applicable

FEDERALLY SPONSORED RESEARCH OR DEVELOPMENT

Not Applicable

TECHNICAL FIELD

This invention relates to analog-to-digital conversion of video image frames, and more particularly to employing image luminance histograms to detect the presence of and correct luminance values of a video signal.

BACKGROUND OF THE INVENTION

Presentations using multimedia projection display systems have become popular for conducting sales demonstrations, business meetings, and classroom instruction. In a common mode of operation, multimedia projection display systems receive analog video signals from a personal computer ("PC"). The video signals represent still, partial-, or full-motion display images of the type rendered by the PC. The analog video signals are converted into digital video signals to control digitally-driven display devices, such as a transmissive or reflective liquid crystal displays or digital micro-mirror devices (hereafter "light valves"), to form the display images for projection onto a display screen. A wide variety of such display systems are available from In Focus Systems, Inc., the assignee of this application.

A necessary feature of multimedia display systems is compatibility with the various analog video signal modes and levels generated by PCs and other video sources. The modes typically range from 640×480 to 1600×1200 resolutions provided at image refresh rates ranging from 60 Hz to 100 Hz. The resolution expresses the number of controllable horizontal and vertical pixel elements that can be turned on and off. Given the variety of display modes, multimedia display systems include an interface that attempts to convert the various analog video signal levels and modes to digital video signals suitable for controlling the light valves.

Analog video signals typically include image information (signal levels) for each of the red, green and blue colors, and timing signals, which may include a horizontal synchronizing pulse ("$H_{SYNC}$") and a vertical synchronizing pulse ("$V_{SYNC}$"), or a composite image and sync signal. The color image information is stored in the PC memory as digital color data and is converted to the analog video signals by digital-to-analog converters. When composite sync is employed, a conventional sync separator is used to extract the $H_{SYNC}$ and $V_{SYNC}$ timing pulses.

The timing signals synchronize the scanning of the analog video signals across a raster-scanned display device. The $H_{SYNC}$ pulse controls the horizontal scanning timing, and the $V_{SYNC}$ pulse controls the vertical scanning or video frame refresh timing.

FIG. 1 shows that each video frame 1 typically includes a central active video region 2 surrounded by an inactive or blanked margin 3. The resolution of a raster-scanned display refers to the number of displayable image information points ("pixels") in active video region 2.

Because the light valves employed by multimedia display systems require digital video signals, either the light valve or the display system normally includes an analog-to-digital converter ("ADC") for converting the PC-generated analog video signals into a digital format suitable for driving the light valve. The ADC is typically digitizes samples of the analog video signal under control of a voltage-controlled oscillator ("VCO"), which is in turn controlled by a phase-locked loop ("PLL") that locks to a predetermined multiple "n" of the $H_{SYNC}$ pulses.

FIG. 2 shows an exemplary analog signal waveform 4, with plateau regions (pixel data components) 5 that correspond to the color levels of individual pixels in the image display. Consecutive pixel data components 5 are connected by signal transition regions 6.

FIG. 2 further shows a typical pixel clock waveform 7, which is generated by the VCO. The number n of pixel clock pulses 8 per $H_{SYNC}$ pulse is typically set to match the resolution mode established by the PC or other analog video source. To determine the resolution mode, certain characteristics of the analog video signal, such as the number of $H_{SYNC}$ pulses per $V_{SYNC}$ pulse, may be used to refer to a mode lookup table. The resulting number n is set to equal the number of pixel data components in each horizontal line of the analog video signal, including those in active video region 2 and blanked margins 3 (FIG. 1). For example, for a 640×480 screen resolution, n may be set to about 800 to include pixels in blanked regions 3 on either side of the 640 pixel-wide active video region 2. Thus, pixel clock pulses 8 would cause the ADC to sample analog signal waveform 4 about 800 times along each horizontal scan line of video frame 1. Unfortunately, n is usually an approximation because it is often difficult to determine the exact proportion of active video region 2 to blanked margin regions 3 (FIG. 1).

FIG. 2 also shows the desired timing relationship between analog signal waveform 4 and pixel clock waveform 7. Ideally, the number n of pixel clock pulses 8 is set to establish a one-to-one relationship between pixel clock pulses 8 and pixel data components 5 of analog signal waveform 4. This one-to-one relationship requires that the pixel clock signal frequency be equal to the analog video signal frequency. Under this relationship, each pixel data component 5 is sampled by a single pixel clock pulse 8, such that the ADC properly digitizes the instantaneous voltage value of each pixel data component 5. Because pixel clock pulses 8 have "jitter" zones 9 at their leading and trailing edges, pixel clock pulses 8 should be centered on pixel data components 5, so that the ADC sampling is not randomly shifted by jitter zones 9 into signal transition regions 6 of analog signal waveform 4.

The stream of digitized signal values from the ADC form the digital video data signal is conveyed to the light valve to activate or deactivate its pixels in a pattern corresponding to the image defined by analog signal waveform 4. Unfortunately, such ADC conversion is often imperfect because of sample timing errors caused by pixel clock pulses 8. Such sample timing errors are typically caused by pixel clock frequency deviations ("tracking" errors) and "phase" errors, both of which may degrade the quality of images generated by the light valve or valves.

FIG. 3 shows a typical tracking error resulting from improperly setting the number n of pixel clocks along the entirety of pixel clock waveform 7'. As described above, the number n of pixel clock pulses 8' should be equal to the number of pixel data components 5 of each horizontal line of analog signal waveform 4. An improper setting of n results in pixel data components 5 being sampled at inconsistent points. For example, n is set too large in pixel clock waveform 7' (i.e. the frequency is too high). The resultant crowding of the pixel clock pulses 8' causes an additive leftward drift of pixel clock pulses 8' relative to pixel data components 5. Such drift causes sampling in signal transition regions 6 as shown by positional bracket A in which leading edges 9' of the third through sixth of pixel clock pulses 8' sample in transition regions 6 of analog signal waveform 4. Accordingly, the transition region data will be erroneous and the image information from adjacent non-sampled pixel data components 5 will be missing from the digitized video signal. If n is erroneously set large enough, pixel clock pulses 8' may be so crowded that individual analog pixel data components 5 may be double-sampled. On the other hand, if n is set too small (i.e. the frequency is too low), the resulting dispersion of pixel clock pulses 8' results in a rightward drift in which sampling may also occur in signal transition regions 6.

To minimize tracking and phase errors, some prior workers have provided some multimedia projection systems with manual controls that permit an operator to adjust the number n and the phase of pixel clocks pulses 8. The controls are adjusted until the projected image appears satisfactory to the eye of the operator. While manual controls are usually effective in achieving an acceptable image quality, adjusting such manual controls is time-consuming and inhibits the user-friendliness of the multimedia projection system.

Accordingly, other prior workers have developed automated pixel clock adjusting techniques. For example, U.S. Pat. No. 5,657,089 for VIDEO SIGNAL PROCESSING DEVICE FOR SAMPLING TV SIGNALS TO PRODUCE DIGITAL DATA WITH INTERVAL CONTROL describes an active video interval detector that generates data indicative of a difference between the detected active video interval and a required reference video interval. A video signal supply interval controller receives the difference data and provides frequency-dividing ratio control data to a programmable frequency divider that is part of the PLL controlling the pixel clock frequency. Over a number of video frames, the difference data is iterated toward zero to achieve accurate pixel clock tracking.

Unfortunately, some PCs generate video signals with an indefinite "black" video level, which makes the transitions between blanked margin regions 3 and a black active video region 2 difficult to determine. Detecting this transition is particularly troublesome when running DOS, graphics, or other programs that generate images having black backgrounds. The problem is made worse by computer display driver systems that cut costs by eliminating the "blacker than black" blanking level offset that is typically found in a standardized video signal format.

Another problem occurs when the analog video signal undergoes a large signal level transition, such as when active video region 2 has a white background color. Because of the fast rise time of such transitions, the analog video signal may include, and/or have overshoot and noise induced into it somewhere along its video processing chain. Moreover, the amount of overshoot on the initial transition in each line may be greater than the amounts of overshoot on subsequent transitions in the same line. The combination of overshoot differences and noise causes video signal value inaccuracies across each scan line so affected. This is particularly troublesome in multimedia projection display systems because projected image brightness is an important performance factor. The ADC and associated signal processing typically assigns a "full scale" signal value to the largest amount of overshoot and noise affected portions of the analog video signal, which causes the real full scale signal values to be less than their overshoot and noise affected values. This problem diminishes the full brightness potential of the projected image.

What is needed, therefore, is an improved technique for detecting the active video region and for correcting erroneous video signal values, thereby increasing projected image clarity and brightness.

SUMMARY OF THE INVENTION

An object of this invention is, therefore, to provide an apparatus and a method for reliably detecting the active video region of an analog video signal.

Another object of this invention is to provide an apparatus and a method for correcting erroneous video signal values.

A further object of this invention is to provide a video image projection system having increased image clarity and brightness.

A histogram is a list of occurrences of a predetermined parameter that falls within a predetermined range of parameter values over a specified collection period. In a preferred embodiment of this invention, a microcontroller and an Application Specific Integrated Circuit ("ASIC") coact to provide at least one, and preferably several, continuously updating histograms for examining and counting real time video data that fall within programmable value ranges and rectangular regions of a video frame. The ASIC includes multiple histogram registers that count the numbers of video data values generated by an ADC that fall within the programmable ranges and regions during each frame of video data.

Video data include difficult to detect transitions between the inactive margins and the active video region of a frame. The transition may include a small step increase in pixel values between the inactive margins and the left and right edges of the active video region, and represents the difference between the blanking pulse and black video levels. Conventional active video region detectors often miss the blanking-to-black transition.

In a first embodiment of this invention, an active video region detector employs histograms to reliably detect the blanking-to-black transitions in a video frame. The microcontroller loads registers in the ASIC to accumulate histograms of low pixel values occurring within rectangular regions corresponding to columns of video data. Histograms collected for columns including the inactive margins reveal that pixel values are clustered in first sets of very low values representing blanking and/or noise levels. Histograms collected for columns including the transition in the active video region reveal that pixel values are further clustered in second sets of low values representing black pixel values. The microcontroller scans the histogram registers to identify the left-most column in which the second set of pixel values is clustered, which column marks the left edge of the active video region. The right edge of the active video region is detected in a similar manner by collecting histograms of the right most columns. However, to identify the right edge, the microcontroller scans the histogram registers to identify the right-most column in which the black pixel values is located. The microcontroller or ASIC then generates an active video signal corresponding to the interval between detection of the left and right edges of the active video region.

As described in the background of this invention, the analog video signal may include, and/or have overshoot and noise induced into it somewhere along its video processing chain. Moreover, the amount of overshoot on the initial transition in each line may be greater than the amounts of overshoot on subsequent transitions in the same line. The combination of overshoot differences and noise causes video signal value inaccuracies across each scan line so affected. Accordingly, when the ADC digitizes the analog video signal, the highest value (brightest) pixels for each color are not always converted to a maximum digital value as intended in the original video signal.

Therefore, in a second embodiment of this invention, histograms are employed to detect the extent of the overshoot and noise condition and cause remapping of the upper range of pixel values to the maximum digital value. The microcontroller programs control registers in the ASIC such that a histogram of the highest pixel values is collected over a rectangular region corresponding to a majority of the active video region. The microcontroller then scans the histogram to locate pixel values having significantly fewer occurrences than most remaining pixel values. For example, the histogram may reveal a rapid decrease in the number of pixels having values greater than some large value. Accordingly, pixels having even greater values fall within the overshoot and noise range. The microcontroller employs this information to remap the upper range of data to the maximum digital values, thereby enhancing image brightness at the high end of the pixel value range.

Additional objects and advantages of this invention will be apparent from the following detailed description of a preferred embodiment thereof which proceeds with reference to the accompanying drawings.

BRIEF DESCRIPTION OF THE DRAWINGS

FIG. 5 is a diagrammatic representation of several lines and columns of a typical video image frame showing pixel image values distributed throughout inactive margin and active video regions of the video image frame.

FIGS. 6A to 6E are graphical representations of histograms of this invention showing the numbers of low-value pixel occurrences within different selected portions of the video image frame of FIG. 5.

DETAILED DESCRIPTION OF PREFERRED EMBODIMENT

Figure 4:
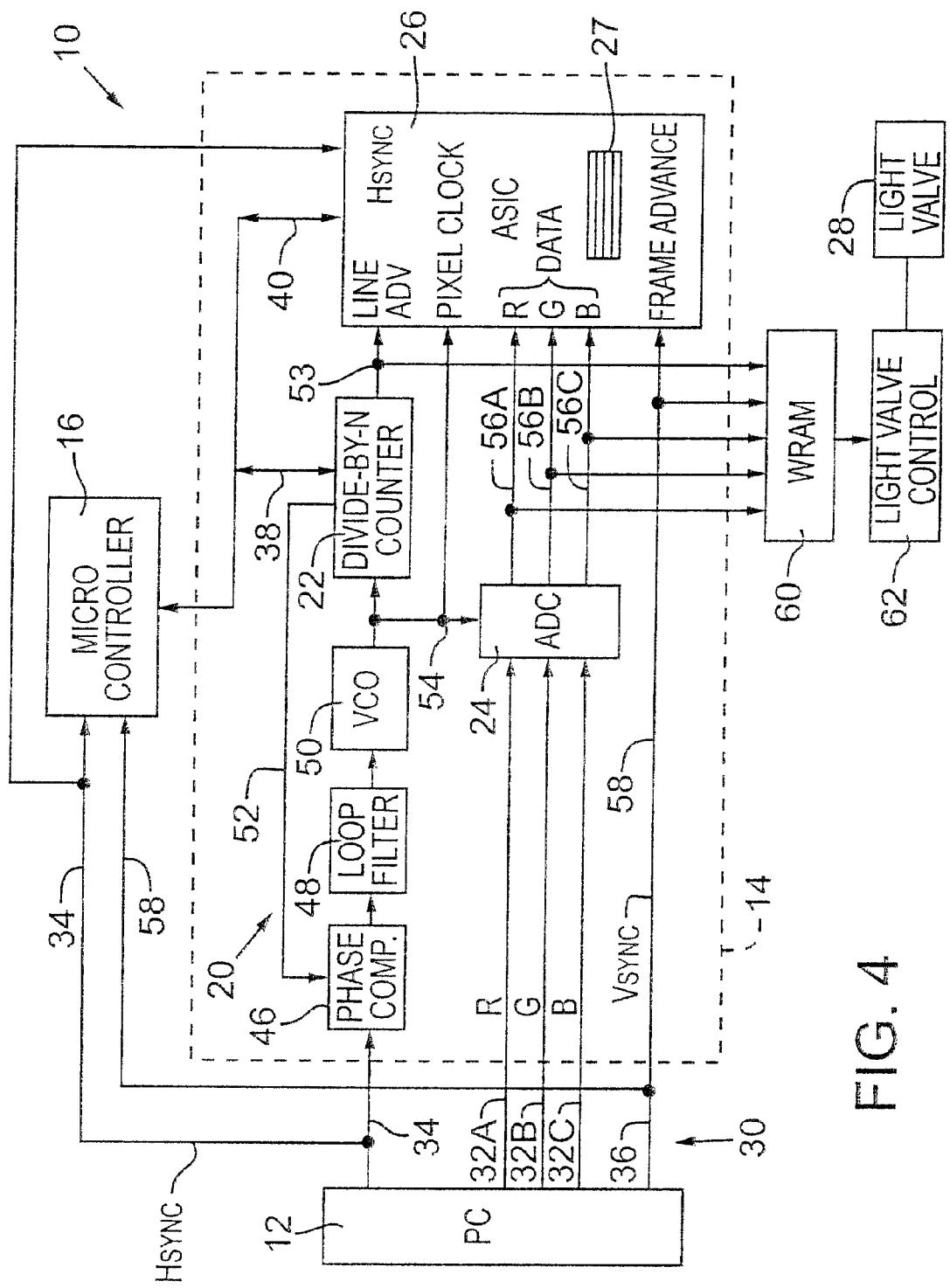
FIG. 4 is an overall simplified schematic block diagram representing a multimedia projection display system suitable for use with this invention and showing an analog video signal digitizing circuit that coacts with histogram-based video signal detection and correction techniques of this invention.

FIG. 4 shows a representative projection display system 10 suitable for use with this invention that is connected to an analog video signal source 12, such as a PC. Projection display system 10 includes an image capture circuit 14 and a microcontroller 16 that cooperate to automatically eliminate tracking errors. Image capture circuit 14 includes a PLL 20, a divide-by-n-counter 22, an ADC 24, and an ASIC 26 that contains image edge and line length counters, pixel data comparators, threshold value registers, and histogram registers 27 to perform active video region detection and luminance correction functions that are described below with reference to FIGS. 6 and 7. Microcontroller 16 executes a firmware program that controls ASIC 26 and counter 22 based on data accumulated in the image edge and line length counters. A light valve 28, is coupled to the output of ADC 24 and ASIC 26.

Multimedia source 12 is connected to projection display system 10 through a conventional video source cable 30 that includes multiple distinct conductors including: three separate channels 32A, 32B, and 32C for carrying analog signals corresponding to red ("R"), green ("G"), and blue ("B") video components; and two conductors 34 and 36 carrying the respective $H_{SYNC}$ and $V_{SYNC}$ pulses. Microcontroller 16 is connected to counter 22 by a bus 38, and to ASIC 26 by a bus 40. Skilled workers will recognize that multiple types of microcontrollers are suitable for use with this invention.

PLL 20 is of conventional design including a phase comparator 46, a low-pass filter 48, and a VCO 50. A feedback loop 52 originating at counter 22 couples a submultiple of the VCO 50 frequency to phase comparator 46. Counter 22 is connected to ASIC 26 through a line advance conductor 53, and VCO 50 is connected to ASIC 26 and ADC 24 through a pixel clock conductor 54. Counter 22 is typically integrated within ASIC 26 or microcontroller 16.

The three analog video data signal channels 32A, 32B, and 32C are connected to ADC 24, which typically includes three separate conventional ADC converters for digitizing each of the R, G, and B analog video signals. Three color data signal channels 56A, 56B, and 56C connect ADC 24 to ASIC 26. The $V_{SYNC}$ signal from multimedia source 12 is connected to ASIC 26 through a frame advance conductor 58.

Line advance conductor 53, digital video data signal channels 56A, 56B, and 56C, and frame advance conductor 58 are all connected to the address inputs of a window random access memory ("WRAM") 60. The output of WRAM 60 is connected to a light valve control module 62 that drives light valve 28. The digital video signals output from image capture circuit 14 are manipulated by WRAM 60 and light valve control module 62 to appropriately control light valve 28.

Figure 1:
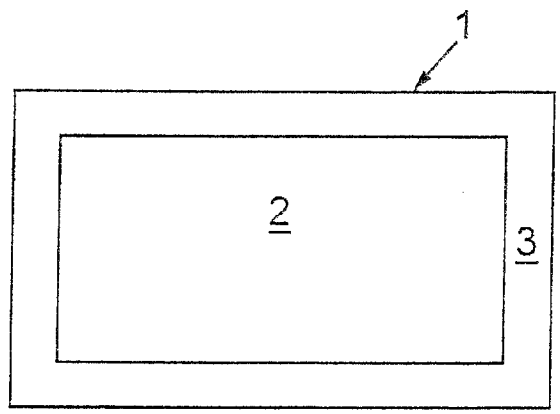
FIG. 1 pictorially represents an exemplary video signal frame, showing a central active video region surrounded by an inactive blanking region.

The analog video signal is preferably digitized in a manner described in copending U.S. patent application Ser. No. 09/545,989, filed Apr. 10, 2000, for METHOD AND APPARATUS FOR DETERMINING A CLOCK TRACKING FREQUENCY IN A SINGLE VERTICAL SYNC PERIOD, which is assigned to the assignee of this application and is incorporated herein by reference. Proper digitization of the analog video signal requires properly setting the pixel clock frequency and the tracking number n. This is accomplished by implementing in ASIC 26 a line parameter detection circuit that includes an active video detector for generating an "active video" signal corresponding to the duration of active video region 2 (FIG. 1). The line parameter detection circuit includes three counters that are incremented by a 50 to 100 MHZ reference clock. The counters are reset and start counting reference clock pulses upon receiving an $H_{SYNC}$ pulse. A left edge register stores the count accumulated in the first counter upon receiving a rising edge of the active video signal, a right edge register stores the count accumulated in the second counter upon receiving a falling edge of the active video signal, and a line length register stores the count accumulated in the third counter upon receiving the next subsequent $H_{SYNC}$ pulse.

Each video signal scan line includes blanked margins 3 between the $H_{SYNC}$ pulses and the active video region. The precise locations and timings of margins 3 are typically unknown, however the period of the active video region is known because it substantially coincides with the active video signal generated by the active video detector. The timing ratio of the active video region to the blanking periods is determined from the line parameter detection circuit, from which the ratio of total blanking time to total line time is determined. The ratio of total blanking time to total line time is used to calculate the overall tracking period, and from that the tracking number n and pixel clock pulse frequency can be determined.

In particular, a left edge count is stored in the left edge register at the first point in time that the active video signal is asserted. The left edge count is sensed by microcontroller 16 for each video data scan line in a video frame, and only the smallest of the left edge counts is saved for processing by microcontroller 16.

Likewise, a right edge count is stored in the right edge register at the last point in time that the active video signal is asserted. The right edge count is sensed by microcontroller 16 for each video data scan line in the video frame, and only the largest of the right edge counts is saved for processing by microcontroller 16.

A total line count is stored in the line length register and is periodically sensed by microcontroller 16 for processing.

Microcontroller 16 computes an active clock count by subtracting the left edge count from the right edge count.

Then microcontroller 16 computes an active region percentage by dividing the active clock count by the total line count.

Microcontroller 16 next computes the tracking number n by dividing a deduced horizontal resolution by the active region percentage. The deduced horizontal resolution, if unknown, is determined by counting the number of $H_{SYNC}$ pulses in the video frame to determine a vertical resolution count and then finding the deduced horizontal resolution from a standard display resolution table. Microcontroller 16 may alternatively compute the pixel clock frequency by multiplying the reference clock frequency by the tracking number n and dividing the result by the total line count.

The above-described parameter calculations depend on the accuracy with which the active video signal timing corresponds to the active video region 2 timing. Accordingly, PLL 20 provides fine tuning of the pixel clock frequency by continuously comparing the $H_{SYNC}$ signal on conductor 34 and the feedback signal received through feedback loop 52, and generating a difference voltage. If the feedback pulse frequency does not equal the $H_{SYNC}$ frequency, the difference voltage causes VCO 50 pixel clock frequency to shift until the feedback pulse frequency from counter 22 locks to the $H_{SYNC}$ frequency.

Figure 2:
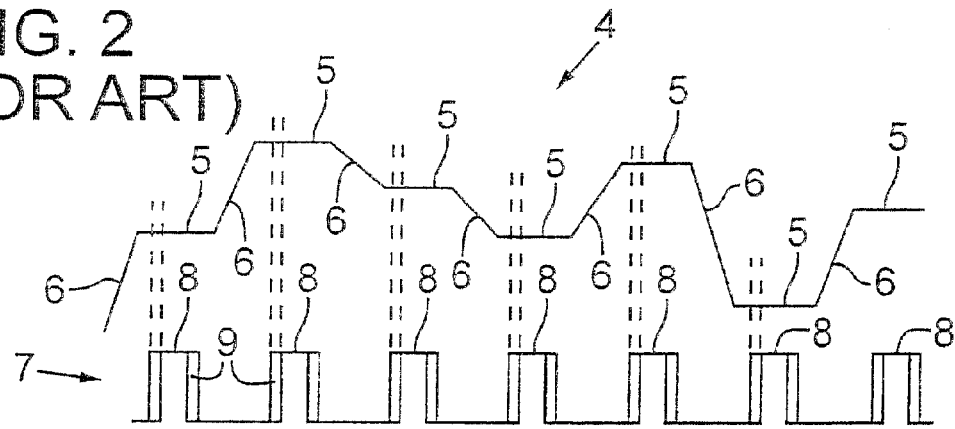
FIG. 2 is an electrical waveform diagram representing an analog video signal waveform and a pixel clock waveform in a desired timing relationship in which no tracking error exists.
Figure 3:
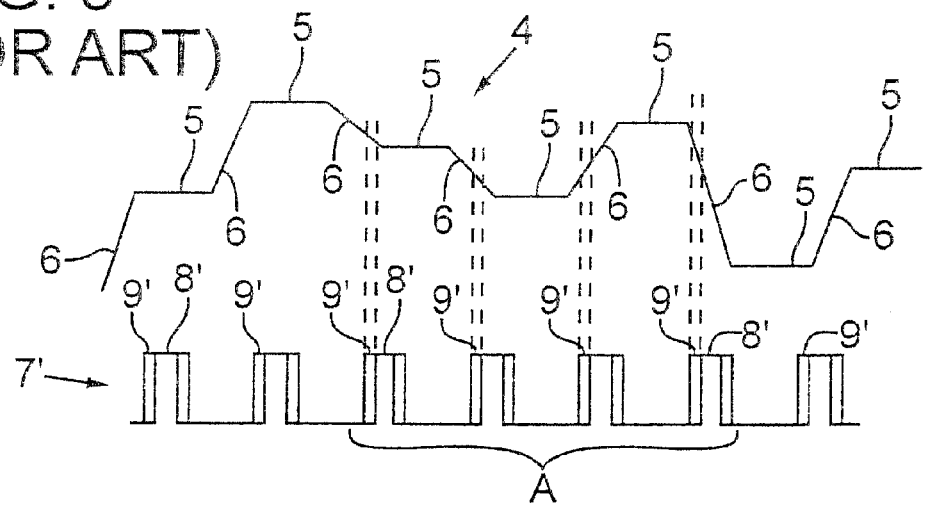
FIG. 3 is an electrical waveform diagram representing an analog video signal waveform and a pixel clock waveform in a undesired timing relationship in which a tracking error exists.

ADC 24 samples the instantaneous voltage value of the analog video data signal in response to each pixel clock pulse 8 (FIG. 2), thereby generating a series of sampled data signal values. ADC 24 then quantifies the sampled values by matching each value to one of a series of preselected voltage amplitude levels, which have corresponding numerical values. These numerical values are then represented digitally and coded to establish 8-bit data for each of the R, G, and B colors. The three eight-bit color data signals are input through the three respective color data signal channels 56a, 56b, 56c to ASIC 26. The coded color data signals set light valve 28 pixels at blank (black) or specific activated (non-black) status corresponding to the sampled voltage value. Of course, WRAM 60 and light valve control 62 can be programmed to modify the coded color data signals to suit particular applications, analog video signal sources 12, and projection display system 10 functions.

As described above, the parameter calculations depend on the accuracy with which the active video signal timing corresponds to the active video region 2 timing. Accordingly, this invention includes a more accurate and reliable histogram-based technique for determining the active video signal timing.

A histogram is a list of occurrences of a predetermined parameter that falls within a predetermined range of parameter values over a specified collection period. ASIC 26 coacts with microcontroller 16 and histogram registers 27 to provide continuously updating histograms having several predetermined programmable ranges. The histograms of this invention count the numbers of video data values generated by ADC 24 that fall within predetermined ranges during each frame of video data. The video data values generated by ADC 24 range between zero and 255, and the programmable histogram ranges define upper and lower data values for each histogram register. For example, there may be 16 histogram registers 27, each programmed to accumulate the number of occurrences of video data values in 16 different ranges, e.g., 0–15, 16–31, . . . , and 240–255.

The ranges are preferably programed such that histogram registers 27 count video data values in particular ranges of interest, such as numbers of single values close to zero, and numbers of single values close to full scale: e.g., 0, 1, 2, 3, . . . , and 15; and 240, 241, 242, . . . , and 255.

The video data collected in the histograms are additionally bounded by programmable rectangular regions preferably specified in X-Y coordinates (pixel column and row numbers) of the video frame to enable examining specified regions of interest in the video frame or image. The rectangular regions are programmed in another set of registers within ASIC 26. For example, there may be eight definable regions, each bounded by a rectangular region defined by two opposite corner X-Y coordinates (X1,Y1) and (X2,Y2). Each histogram register is, therefore, programmable to count all the video data values that fall within predetermined value ranges and within predetermined X-Y coordinate regions. The counts are preferably accumulated and stored for video data collected over each video frame 1 (FIG. 1), and are updated for each successive video frame 1.

Referring to FIGS. 4 and 5, the $V_{SYNC}$ signal initiates each video frame 1, and ADC 24 generates streams of R, G, and B color video data that are processed by ASIC 26 to determine the number of occurrences of predetermined value ranges for each of the R, G, and B colors of each pixel. Histograms are constructed for each of the R, G, and B color data streams with each color having approximately 255 shades or values.

In particular, FIG. 5 shows several lines and columns of an exemplary 600 by 800 pixel video image frame 1 with pixel image values distributed throughout active video region 2 and inactive margins 3. To improve clarity, only the corner regions of video image frame 1 are shown, and only one color channel is shown. Active video region 2 lies between corner coordinates (3, 3) and (798, 598). Inactive margins 3 include columns 1, 2, 799, and 800; and rows 1, 2, 599, and 600. Note that the pixel values in inactive margins 3 range from 0 to 5 and the pixel values in active video region 2 range from 9 to 255. However, the pixel values in columns 3, 4, 797, and 798 of active video region 2 range from 9 to only 13. The small step increase in pixel values between inactive margins 3 and the left and right edges of active video region 2 represents the difficult to detect transition between the blanking pulse and black video levels. Conventional active video region detectors often miss the blanking-to-black transition and, instead, detect the larger pixel value transitions existing between columns 4 and 5 and columns 796 and 797.

In contrast, the active video region detector of this invention reliably detects the blanking-to-black transition by employing histograms collected by ASIC 26 in histogram registers 27.

FIGS. 6A to 6E represent histograms of pixel values collected within rectangular regions 70, 71, 72, 73, and 74, which are represented in bold lines surrounding respective columns 1 to 5 of video image frame 1 in FIG. 5. Microcontroller 16 preferably loads registers in ASIC 26 to define rectangular regions 70 to 74.

FIGS. 6A and 6B reveal that pixel values in rectangular regions 70 and 71 (columns 1 and 2) are clustered in first sets 76 of values ranging between 0 and 5.

FIGS. 6C and 6D reveal that pixel values in rectangular regions 72 and 73 (columns 3 and 4) are clustered in first sets 78 of values ranging between 0 and 5 and second sets 80 of values ranging between 9 and 13.

FIG. 6E reveals that pixel values in rectangular region 74 (column 5) are clustered in a first set 82 of values ranging between 0 and 5 and a second set 84 of values greater than 200. Because only low values of pixels are relevant to detecting active video region 2, second set 84 of values greater than 200 is ignored.

Microcontroller 16 scans histogram registers 27 to identify the left-most rectangular region in which each set of pixel values is located. In this example, rectangular region 70 (column 1) is the left-most region encompassing first sets 76 and 78 of pixel values, and rectangular region 72 (column 3) is the left-most region encompassing the second set 80 of pixel values. Accordingly, rectangular region 72 (column 3) marks the left edge of active video region 2.

The right edge of active video region 2 is detected in a similar manner by collecting histograms of rectangular regions corresponding to columns 796 to 800 of video image frame 1. However, to identify the right edge, microcontroller 16 scans histogram registers 27 to identify the right-most rectangular regions in which each set of pixel values is located. Microcontroller 16 or ASIC 26 generates an active video signal corresponding to the time interval between detection of the left and right edges of active video region 2.

Alternatively and preferably, the rectangular regions should be programmed to match the expected video frame format being employed. For example, the rectangular regions need to encompass only the range of columns in which blanking-to-black pixel value transitions are expected. Most preferably, the rectangular region corresponding to a column is moved from column 1 to the right once per frame until second set 80 of pixel values is first collected, thereby indicating the first column of active video region 2. Likewise the rectangular region corresponding to a column is moved from column 800 to the left once per frame until a rightmost second set of pixel values is first collected, thereby indicating the last column of active video region 2.

This invention also employs histogram registers 27 to enhance the average luminous output (brightness) of the image projected by projection display system 10. As described in the background of this invention, the analog video signal may include, and/or have overshoot and noise induced into it somewhere along its video processing chain. Moreover, the amount of overshoot on the initial transition in each line may be greater than the amounts of overshoot on subsequent transitions in the same line. The combination of overshoot differences and noise causes video signal value inaccuracies across each scan line so affected. Accordingly, when ADC 24 digitizes the analog video signal, the highest value (brightest) pixels for each color are not always converted to a maximum digital value as intended in the original video signal. By employing histogram registers 27, the extent of this condition can be detected, and the upper range of pixel values can be remapped to the maximum digital value.

Figure 7:
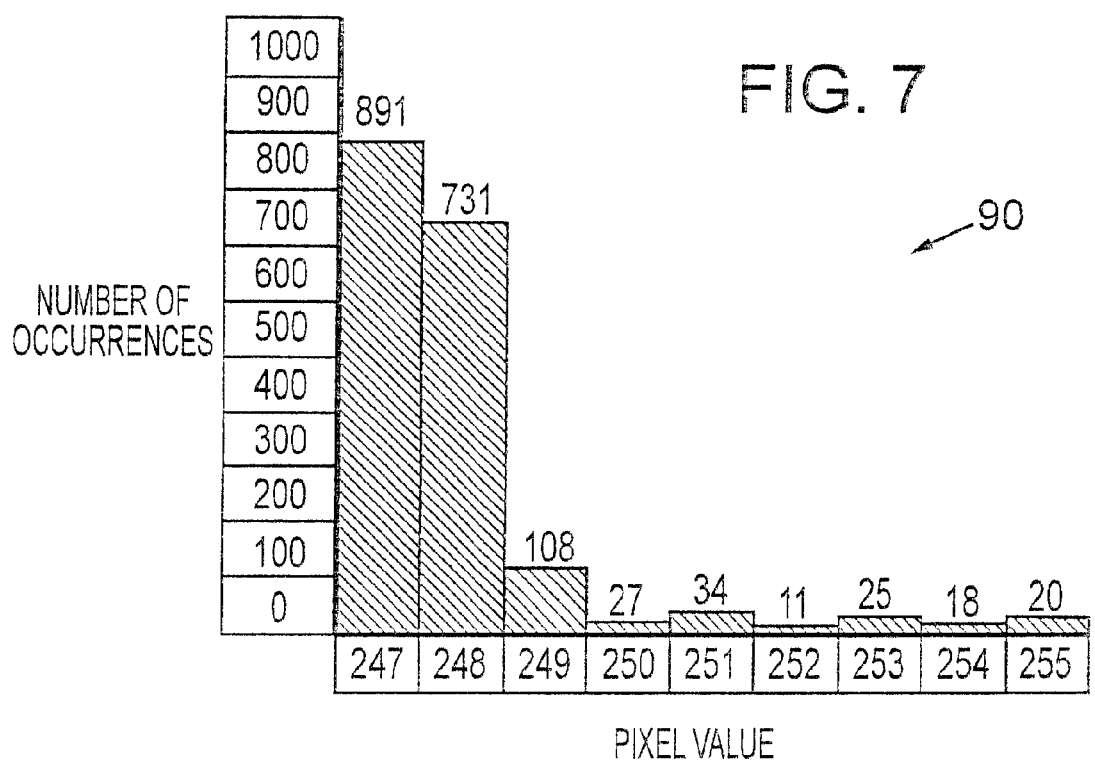
FIG. 7 is a graphical representation of a histogram of this invention showing the numbers of high-value pixel occurrences within an active video region portion of the video image frame of FIG. 5.

Referring to FIGS. 5 and 7, microcontroller 16 programs control registers in ASIC 26 such that a histogram 90 is collected over a rectangular region corresponding to a majority of active video region 2. Only the highest range of pixel values need to be collected, for example, pixel values ranging from 247 to 255. Microcontroller 16 scans histogram 90 to locate high pixel values having significantly fewer occurrences than the remaining, lower pixel values. For the example video frame 1 of FIG. 5, histogram 90 reveals a rapid decrease in the number of pixels having values greater than 249. Accordingly, pixels having values ranging from 250 to 255 fall within the above-described overshoot and noise range. Microcontroller 16 employs this information to remap the upper range of data, which in the analog domain was meant to have the maximum values, to have the maximum digital values, thereby enhancing image brightness at the high end of the pixel value range.

The remapping is accomplished by either writing remapping values into WRAM 60 or by increasing the gain of white reference level amplifiers in ADC 24 until the highest value pixel (255) in histogram 90 has a significant number of occurrences, for example, more than 100. Therefore, in the above-described example, pixel values ranging from 250 to 155 would all be expanded in value to 255. If the maximum pixel values are not adjusted, the projected image would not be as bright as light valve 28 could produce. This invention is particularly advantageous with employed with display devices having exponentially increasing brightness at the high pixel-value end of the range.

Skilled workers will understand that there are many ways within their abilities to implement this invention. For example, the histogram registers and/or the ADC may be implemented within the microcontroller. Some implementations will not require an ASIC. The ADC range is not limited to 8-bits, the number of histogram registers employed may be varied and may employ different ranges and regions than the ones described above. Moreover, the histogram ranges may accumulate pixel values derived from logical functions, such as greater than, less than, exclusive OR; and the histogram regions may be other than rectangular. The invention was described in the context of a single monochrome video frame but is, of course, applicable to multiple frame color image systems as well. In such systems, separate histograms can be collected from each color frame, a logical combination of frames, or the frame having the largest (or smallest) pixel values in the region of interest. Of course, this invention may be employed in display systems other than those found in image projection applications.

It will be obvious to those having skill in the art that many changes may be made to the details of the above-described embodiments of this invention without departing from the underlying principles thereof. The scope of this invention should, therefore, be determined only by the following claims.

We claim:

1. In a display system in which an image is formed from a video frame organized in rows and columns of analog pixel values, the frame of data further including an inactive margin region and an active video region, an improved video frame parameter detection apparatus comprising:
   at least one analog-to-digital converter digitizing the analog pixel values into digital pixel values;
   at least one region register storing data corresponding to a predetermined region of the video frame, the predetermined parameter including at least one column in which the inactive margin region transitions to the active video region;
   at least one histogram register sampling the digital pixel values and storing a histogram representing counts of a number of occurrences of a predetermined range of the digital pixel values occurring within the predetermined region of the video frame stored in the region register; and
   a microcontroller programming the histogram register to sample the predetermined range of pixel values, programming the histogram register to sample the pixel values occurring within the predetermined region, and analyzing the resulting histogram to detect a predetermined parameter of the video frame.

2. The apparatus of claim 1 in which the histogram register is programmed such that the predetermined range of digital pixel values has a range including a blanking level value and a black pixel value.

3. The apparatus of claim 1 in which the histogram register is programmed such that the predetermined region includes at least one column of the video frame.

4. The apparatus of claim 1 in which the histogram register is programmed to sample digital pixel values including a blanking level value and a black pixel value that occur in a region including at least one column of the video frame, and in which the region in repositioned through a set of columns over a set of video frames such that the microcontroller can examine a corresponding set of histograms to determine in which column the digital pixel values transition from the blanking level value to at least the black pixel value.

5. The apparatus of claim 1 in which the display system is a video image projector.

6. The apparatus of claim 1 in which the histogram is collected during a single, frame period and updated during successive frame periods.

7. The apparatus of claim 1 in which the analog-to-digital converter has a full scale range and in which the predetermined parameter includes identifying an effective maximum pixel value in the range of digital pixel values within the active video region, wherein the effective maximum pixel value is less than a full scale pixel value and the effective maximum pixel value limits a luminance of the display system.

8. The apparatus of claim 7 in which the histogram register is programmed such that the predetermined range of digital pixel values includes the effective maximum pixel value and the full scale pixel value.

9. The apparatus of claim 7 in which the histogram register is programmed such that the predetermined region includes a majority of the active video region.

10. The apparatus of claim 7 in which the histogram register counts occurrences of digital pixel values in a range including the effective maximum pixel value and the full scale pixel value that occur within a majority of the active video region such that the microcontroller can examine the resulting histogram to determine the effective maximum pixel value and cause an analog-to-digital converter gain change that increases the effective maximum pixel value toward the full scale pixel value, thereby increasing the luminance of the display system.

11. In a display system in which an image is formed from a video frame organized in rows and columns of analog pixel values, the frame of data further including an inactive margin region and an active video region, an improved method for detecting a video frame parameter comprising:
   digitizing the analog pixel values into digital pixel values;
   storing a histogram representing counts of a number of occurrences of a predetermined range of the digital pixel values occurring within a predetermined region of the video frame; and
   analyzing the resulting histogram to detect a predetermined parameter of the video frame, the predetermined parameter including at least one column in which the inactive margin region transitions to the active video region.

12. The method of claim 11 in which the predetermined range of digital pixel values has a range including a blanking level value and a black pixel value.

13. The method of claim 11 in which the predetermined region includes at least one column of the video frame.

14. The method of claim 11 in which the digital pixel values include a blanking level value and a black pixel value that occur in a region including at least one column of the video frame, the method further including repositioning the region through a set of columns and examining a corresponding set of histograms to determine in which column the digital pixel values transition from the blanking level value to at least the black pixel value.

15. The method of claim 11 in which the display system is a video image projector.

16. The method of claim 11 in which the histogram is collected during a single frame period and updated during successive frame periods.

17. The method of claim 11 in which the digitizing can achieve a full scale value and in which the predetermined parameter includes identifying an effective maximum pixel value in the range of digital pixel values within the active video region, wherein the effective maximum pixel value is less than a full scale pixel value and the effective maximum pixel value limits a luminance of the display system.

18. The method of claim 17 in which the predetermined range of digital pixel values includes the effective maximum pixel value and the full scale pixel value.

19. The method of claim 17 in which the predetermined region includes a majority of the active video region.

20. The method of claim 17 in which the histogram includes counts of occurrences of digital pixel values in a range including the effective maximum pixel value and the full scale pixel value that occur within a majority of the active video region, the method further including examining the resulting histogram to determine the effective maximum pixel value and changing a display system gain to increase the effective maximum pixel value toward the full scale pixel value, thereby increasing the luminance of the display system.

21. In a display system in which an image is formed from a video frame organized in rows and columns of analog pixel values, the frame of data further including an inactive margin region and an active video region, an improved video frame parameter detection apparatus comprising:

at least one analog-to-digital converter digitizing the analog pixel values into digital pixel values, the analog-to-digital converter having a full scale range;

at least one region register storing data corresponding to a predetermined region of the video frame;

at least one histogram register sampling the digital pixel values and storing a histogram representing counts of a number of occurrences of a predetermined range of the digital pixel values occurring within the predetermined region of the video frame stored in the region register; and a microcontroller programming the histogram register to sample the predetermined range of pixel values, programming the histogram register to sample the pixel values occurring within the predetermined region, and analyzing the resulting histogram to detect a predetermined parameter of the video frame, the predetermined parameter including identifying an effective maximum pixel value in the range of digital pixel values within the active video region, wherein the effective maximum pixel value is less than a full scale pixel value and the effective maximum pixel value limits a luminance of the display system.

22. The apparatus of claim 21 in which the predetermined parameter includes the column or columns in which the inactive margin region transitions to the active video region.

23. The apparatus of claim 22 in which the histogram register is programmed such that the predetermined range of digital pixel values has a range including a blanking level value and a black pixel value.

24. The apparatus of claim 22 in which the histogram register is programmed such that the predetermined region includes at least one column of the video frame.

25. The apparatus of claim 22 in which the histogram register is programmed to sample digital pixel values including a blanking level value and a black pixel value that occur in a region including at least one columns of the video frame, and in which the region in repositioned through a set of columns over a set of video frames such that the microcontroller can examine a corresponding set of histograms to determine in which column the digital pixel values transition from the blanking level value to at least the black pixel value.

26. The apparatus of claim 21 in which the display system is a video image projector.

27. The apparatus of claim 21 in which the histogram is collected during a single frame period and updated during successive frame periods.

28. The apparatus of claim 21 in which the histogram register is programmed such that the predetermined range of digital pixel values includes the effective maximum pixel value and the full scale pixel value.

29. The apparatus of claim 21 in which the histogram register is programmed such that the predetermined region includes a majority of the active video region.

30. The apparatus of claim 21 in which the histogram register counts occurrences of digital pixel values in a range including the effective maximum pixel value and the full scale pixel value that occur within a majority of the active video region such that the microcontroller can examine the resulting histogram to determine the effective maximum pixel value and cause an analog-to-digital converter gain change that increases the effective maximum pixel value toward the full scale pixel value, thereby increasing the luminance of the display system.

31. In a display system in which an image is formed from a video frame organized in rows and columns of analog pixel values, the frame of data further including an inactive margin region and an active video region, an improved method for detecting a video frame parameter comprising:

digitizing the analog pixel values into digital pixel values including a full scale value;

storing a histogram representing counts of a number of occurrences of a predetermined range of the digital pixel values occurring within a predetermined region of the video frame; and analyzing the resulting histogram to detect a predetermined parameter of the video frame, the predetermined parameter including identifying an effective maximum pixel value in the range of digital pixel values within the active video region, wherein the effective maximum pixel value is less than the full scale pixel value and the effective maximum pixel value limits a luminance of the display system.

32. The method of claim 31 in which the predetermined parameter includes the column or columns in which the inactive margin region transitions to the active video region.

33. The method of claim 32 in which the predetermined range of digital pixel values has a range including a blanking level value and a black pixel value.

34. The method of claim 32 in which the predetermined region includes at least one column of the video frame.

35. The method of claim 32 in which the digital pixel values include a blanking level value and a black pixel value that occur in a region including at least one column of the video frame, the method further including repositioning the region through a set of columns and examining a corresponding set of histograms to determine in which column the digital pixel values transition from the blanking level value to at least the black pixel value.

36. The method of claim 31 in which the display system is a video image projector.

37. The method of claim 31 in which the histogram is collected during a single frame period and updated during successive frame periods.

38. The method of claim 31 in which the predetermined range of digital pixel values includes the effective maximum pixel value and the full scale pixel value.

39. The method of claim 31 in which the predetermined region includes a majority of the active video region.

40. The method of claim 31 in which the histogram includes counts of occurrences of digital pixel values in a range including the effective maximum pixel value and the full scale pixel value that occur within a majority of the active video region, the method further including examining the resulting histogram to determine the effective maximum pixel value and changing a display system gain to increase the effective maximum pixel value toward the full scale pixel value, thereby increasing the luminance of the display system.

* * * * *